UNITED STATES PATENT OFFICE.

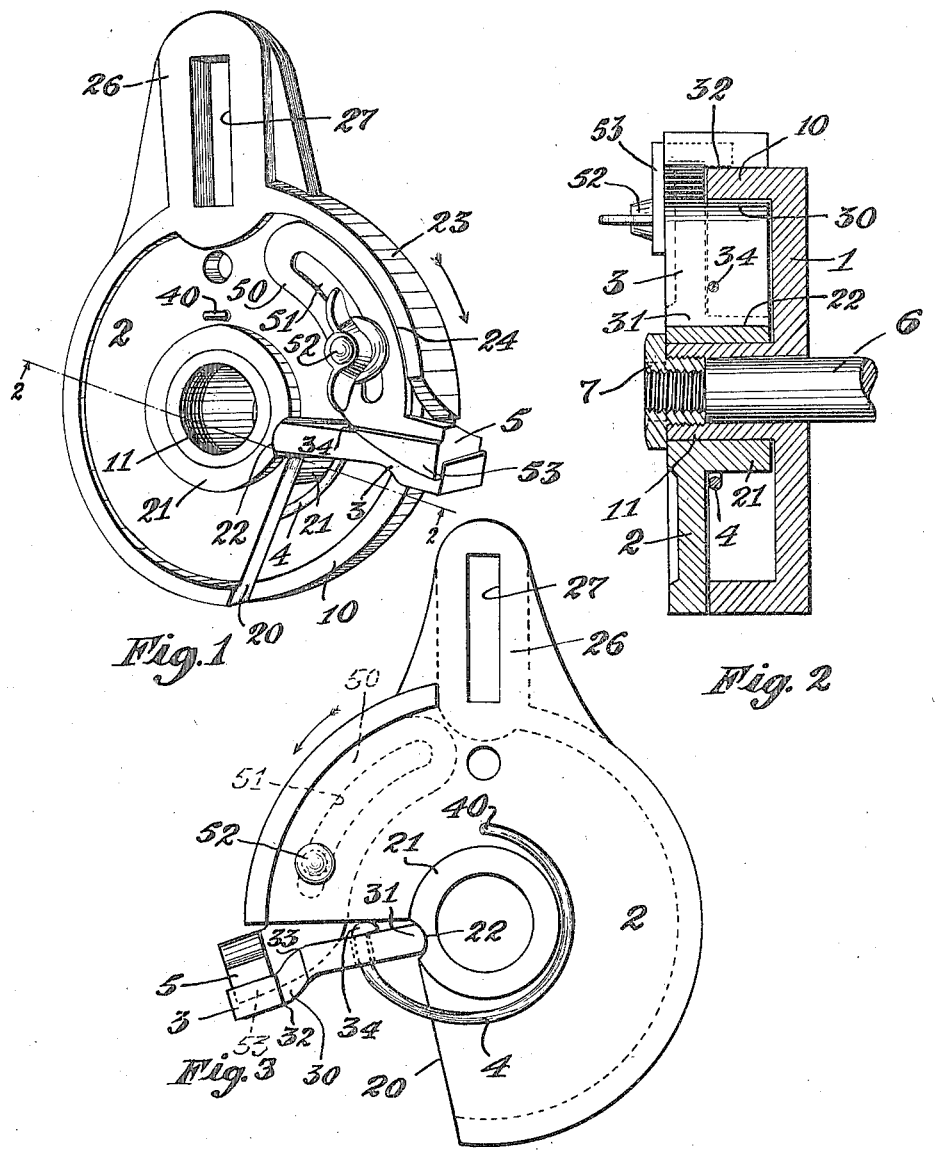
T. H. MAURSETH & L. BEIRL.
CLUTCH FEEDING DEVICE.
APPLICATION FILED JAN. 14, 1916.
1,202,558.
Patented Oct. 24, 1916.
INVENTORS
Thorsten H. Maurseth.
Louis Beirl.
BY
Reynolds & Kroll
ATTORNEYS.

THORSTEN H. MAURSETH AND LOUIS BEIRL, OF SEATTLE, WASHINGTON.

CLUTCH FEEDING DEVICE.

1,202,558.  Specification of Letters Patent.  Patented Oct. 24, 1916.

Application filed January 14, 1916. Serial No. 72,169.

*To all whom it may concern:*

Be it known that we, THORSTEN H. MAURSETH and LOUIS BEIRL, citizens of the United States, and residents of Seattle, in the county of King and State of Washington, have invented certain new and useful Improvements in Clutch Feeding Devices, of which the following is a specification.

Our invention relates to clutch feeding mechanisms of a type which is intended for intermittent advancement of a shaft.

The object of our invention is to provide a device for this purpose, which is particularly adapted for use upon shingle mills in feeding the shingle block to the saw. It is of course adapted for other analogous uses, and we do not care to have our invention limited to this use exclusively.

Our invention comprises the novel parts and combinations of parts which will be hereinafter described and particularly pointed out in the claims.

In the accompanying drawings we have shown our invention in the form of construction which is now most preferred by us.

Figure 1 shows our device in perspective, the view showing the outer side thereof. Fig. 2 is a section thereof on the center line on a plane parallel to the line 2—2 of Fig. 1. Fig. 3 is a face view of the inner face of the driving member.

In machines for sawing shingles the shingle block is fed to the saw by an intermittent movement of small extent, and this movement is usually transmitted through a shaft, the angular movement of the shaft at one time being slight. The device as herein shown is designed to be attached to this shaft, and the shaft is shown at 6 in Fig. 2. Upon this shaft is secured a disk or wheel 1, which has an axially projecting flange 10 concentric with the shaft 6. In our type of construction this disk is provided with a hub 11 which is secured upon the shaft 6 in any suitable manner.

The driving member, as herein shown, consists of a disk 2, which is provided with a hub 21 journaled upon the outside of the hub 11 of the wheel 1. This disk bears against the outer face of the flange 10, and has a segment at one side cut away as shown at 20, for the reception of the clutch dog. Means are also provided by which this disk may be engaged in order to oscillate it upon its axis, and this as herein shown consists of an arm 26, having a radially extending slot 27 through which a bolt may be passed to secure thereto a rod or other means by which it may be given movement. Any other means of attaching thereto may be used which is found suitable.

The clutch dog 3 consists of a block or short piece of bar having a transverse slot 30 therein, in one end, adapted to span or snugly fit over the flange 10 of the driven member 1. To increase the effective thickness of the clutch dog where cut by the slot 30, we may give it an offset bend, thereby separating the engaging corners 32 and 33 more than they would otherwise be separated. A sufficiently powerful grip is retained while the deforming tendency due to the more powerful action due to a narrower bar is prevented. By oscillating this clutch dog the corners 32, 33 of the slot 30 will bite upon opposite faces of the flange and engage it so that it may be turned. This clutch dog extends in a substantially radial direction; its inner end 31 enters a slot 22 which extends axially in the hub 21 of disk 2. The hub and dog may be engaged in any other manner which will permit the communication of angular movement between the two.

A spring consisting of a slight bar or wire 4, has one end passing through the clutch dog at 34, from whence it passes about the hub 21 and has its other end laterally bent and entering a hole in the disk 2. This end may be secured to the disk in any other manner found suitable. This spring should have such tension as will act to pull the dog 3 toward the center, and also to slightly rock it in a direction which is away from the stop 5. This rocking tendency is preferably only slight, just enough to take up slack. While such a spring at times adds to the perfection of operation of the clutch dog, it is not essential to some uses.

A stop 5 is provided, this consisting of a radially extending portion which extends along the side of the dog 3, and the segmental arm 50 which is provided with an arcuate slot 51, through which passes a clamping bolt 52.

The disk 2 preferably has a slight flange 24 projecting enough to constitute a bearing for the outer edge of the arm 50 of the stop, whereby this stop is securely held in adjusted position. The stop 5 is also preferably provided with a flange 53, which extends over the outer edge of the dog 3, thus preventing its movement in an angular direction.

The driving disk 2 is preferably provided with a segmental flange 23 which extends over or outside of the flange 10 of the driven member. This flange 23 need not extend over any very large portion of the circle. Its purpose is to prevent any accumulation of saw-dust upon the surfaces of the flange 10, which is engaged by the clutch dog.

The driving member 2 may be secured against removal from the hub of the driven member by means of a bolt which is secured to the shaft or to the hub of the driven member, as is found most convenient.

We have herein shown a nut 7, which is tubular and is threaded both internally and externally so that it may be screwed both upon shaft 6 and into the hub of the wheel 1. Its head is large enough to overlap the hub of the driving disk 2 enough to prevent its removal. A washer may be placed under this nut when desired and this may extend outward enough to engage the inner end of the clutch dog 3. This is however unnecessary as the spring 4 will prevent axial removal of the dog, as will also the flange 53 of the stop 5.

The function of the stop 5 is to prevent movement of the dog 3 backward any material distance from the point at which it engages with the flange 10. This stop will compel the retracting movement of the dog should any particles clog its movement so that afterward it would not retract enough to give the proper advancing movement to the driven member 1.

What we claim as our invention is:

1. An intermittent feed device comprising a driven member having an axially projecting flange concentric with its rotative axis, a concentrically journaled driving member, a clutch dog having a slot spanning the flange of the driven member, the driving member having actuative engagement with one end of the dog, and an arm adjustably mounted on the driving member and adapted to engage the dog to insure free movement of the dog along the flange in one direction.

2. An intermittent feed device comprising a driven member having an axially projecting flange concentric with its rotative axis, a concentrically journaled driving member, a clutch dog having a slot spanning the flange of the driven member, the driving member having actuative engagement with one end of the dog, and an arm adjustably mounted on the driving member and adapted to engage the dog to insure free movement of the dog along the flange in one direction; said arm and the dog having engaging parts preventing outward movement of the dog in an axial direction.

3. An intermittent feed device comprising a driven member having an axially projecting flange concentric with its rotative axis, a concentrically journaled driving member, a clutch dog having a slot spanning the flange of the driven member, the driving member having actuative engagement with one end of the dog, and an arm adjustably mounted on the driving member and adapted to engage the dog to insure free movement of the dog along the flange in one direction; said arm having a flange projecting over the outer edge of the dog to prevent its movement in the direction of the axis.

4. An intermittent feed device comprising a rotative driven member having an axially projecting concentric flange, a driving member having a hub concentrically journaled and having an axially extending channel in its outer surface, a clutch dog having a slot spanning said flange and one end entering the said channel of the driving member, and a member carried by the driving member and angularly adjustable thereon and having a flange extending over the clutch dog to prevent its movement axially.

5. An intermittent feed device comprising a rotative driven member having an axially extending concentric flange, a driving member comprising a disk journaled concentric with said flange and having a flange segment extending over the flange of the driven member, a clutch dog having a slot spanning the flange of the driven member, one end of said clutch dog and the driving member having engagement for angular movement.

6. An intermittent feed device comprising a rotative driven member having an axially extending concentric flange, a driving member comprising a disk journaled concentric with said flange and having a flange segment extending over the flange of the driven member, a clutch dog having a slot spanning the flange of the driven member, one end of said clutch dog and the driving member having engagement for angular movement, and a stop mounted for angular adjustment upon the driving member close to one side of the clutch dog.

7. An intermittent feed device comprising a rotative driven member having an axially extending concentric flange, a driving member comprising a disk journaled concentric with said flange and having a flange segment extending over the flange of the driven member, a clutch dog having a slot spanning the flange of the driven member, one end of said clutch dog and the driving member having engagement for angular movement; a stop having an arcuate slot and a securing bolt passing through said slot and securing the stop to the driving disk close at one side of the clutch dog.

8. An intermittent feed device comprising a rotative driven member having a central hub and an axially projecting flange located outwardly from the hub, a driving member comprising a disk having a hub journaled on the hub of the driven member, a clutch dog having a slot spanning the flange of the driven member, the inner end of the clutch dog having driving engagement with the hub of the driving member and a segmental stop arm having an arcuate slot, and a bolt passing through said slot into the driving disk to secure the stop in position to contact with one face of the clutch dog, the disk having a segment flange engaging one edge of said arm.

Signed at Seattle, Washington, this 28th day of December, 1915.

THORSTEN H. MAURSETH.
LOUIS BEIRL.